United States Patent Office 3,454,601
Patented July 8, 1969

3,454,601
CYCLOPENTYL ETHERS OF STILBENE DERIVATIVES
John H. Fried, Palo Alto, Calif., assignor to Syntex Corporation, Republic of Panama, a corporation of Panama
No Drawing. Filed June 22, 1966, Ser. No. 559,407
Int. Cl. C07c 39/22; C07d 7/02, 5/02
U.S. Cl. 260—345.9                    10 Claims

ABSTRACT OF THE DISCLOSURE

Cyclopentyl ethers of trans stilbenes having the formula

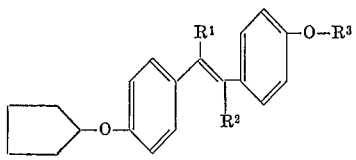

wherein each of $R^1$ and $R^2$ represents hydrogen or lower alkyl and $R^3$ represents hydrogen, cyclopentyl, tetrahydrofuran-2'-yl, tetrahydropyran-2'-yl, or a hydrocarbon carboxylic acyl group of less than 12 carbon atoms. These compounds are orally active estrogenic agents and are useful in replacement therapy for estrogen deficiencies, to increase feed consumption in livestock, and as fertility regulatory agents for control of rodents.

---

This invention relates to certain novel organic compounds. More specifically it is directed to the cyclopentyl ethers of trans stilbenes, represented by the following structural formula:

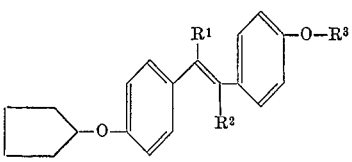

wherein each of $R^1$ and $R^2$ represents hydrogen or (lower) alkyl of less than 6 carbon atoms and $R^3$ represents hydrogen, cyclopentyl, tetrahydrofuran - 2' - yl, tetrahydropyran-2'-yl, or a hydrocarbon carboxylic acyl group of less than 12 carbon atoms.

By the term (lower)alkyl in the foregoing definition is meant a monovalent radical derived from a saturated branched or straight chain hydrocarbon containing less than 6 carbon atoms, such as methyl, ethyl, n-propyl, isopropyl, butyl, amyl, hexyl, and the like. The hydrocarbon carboxylic acyl groups of this invention will contain less than 12 carbon atoms and may be of a straight, branched, cyclic, or cycloaliphatic chain structure. These are saturated, unsaturated, or aromatic and are optionally substituted by such functional groups as hydroxy, alkoxy containing up to 6 carbon atoms, acyloxy containing up to 12 carbon atoms, nitro, amino, halo, and the like. Typical ester groups thus include acetate, propionate, enanthate, benzoate, trimethylacetate, t-butylacetate, phenoxyacetate, aminoacetate, β - chloropropionate, adamantoate, and the like.

The novel products provided by this invention are orally active estrogenic agents and are thus useful in replacement therapy for cases of estrogen deficiencies. These compounds are also useful to increase feed consumption in livestock with resultant fattening and improved appearance. They are also useful as fertility regulatory agents, notably for the control of rodents and other pests.

The novel biscyclopentyl ethers of the present invention are provided by treatment of a dihydroxystilbene derivative, such as stilbestrol, 3,4-bis-(p-hydroxyphenyl)-3-hexene, and the like, with at least two molar equivalents each of an alkali metal hydride, preferably sodium hydride, and a cyclopentyl halide, such as cyclopentyl chloride and cyclopentyl iodide and, preferably, cyclopentyl bromide, in an inert organic solvent, such as benzene, toluene, xylene, tetrahydrofuran, dioxane, and the like, preferably at reflux temperatures. The corresponding monoethers are prepared either by treating a monohydroxystilbene derivative with equal molar quantities each of alkali metal hydride and cyclopentyl halide with respect to the amount of stilbene derivative reactant or, alternatively, by acetylating the starting dihydroxystilbene such as with acetic anhydride in pyridine to give a mixture of mono- and diacetoxy compounds, separating the monoacetoxy compound such as by preparative chromatography, etherifying the remaining hydroxyl according to the process hereof as described above, and removing the acetoxy group upon mild base hydrolysis. The product in each instance is readily separated from the inert organic solvent reaction medium by conventional methods, such as evaporation, chromatography, and the like.

Those compounds of the above formula in which $R^3$ is tetrahydrofuran-2'-yloxy and tetrahydropyran-2'-yloxy are prepared by treating the monocyclopentyl ether prepared as described above with dihydrofuran and dihydropyran respectively in the presence of acid catalyst in organic solvent. Those compounds of the above formula in which $R^3$ is a hydrocarbon carboxylic acyl group can be prepared by originally treating these starting dihydroxystilbene derivatives with an appropriate acylating agent, such as acetic anhydride, propionic anhydride, and the like, or benzoyl chloride, adamantoyl chloride, and the like, separating and removing the mono- and diacyl compound as described above and etherifying the remaining hydroxyl according to the process of this invention. Alternatively, these ester substituents can be similarly provided on the monohydroxy-monocyclopentyloxy derivatives, provided as described above.

The starting dihydroxystilbene derivatives of this invention are obtained by known processes. The preferred embodiments of this invention involve the choice of an appropriately substituted stilbestrol, such as diethylstilbestrol and thereafter treating this starting substituted stilbene derivative according to the preferred practices described hereinbefore.

The following examples serve to illustrate the manner by which this invention can be practiced but they should not be construed as limitations upon the overall scope hereof.

Example 1

A solution of 5 g. of stilbestrol in 30 ml. of benzene is heated to reflux and about 2 ml. removed by distillation to eliminate moisture. The mixture is cooled to room temperature and two chemical equivalents (based upon the amount of stilbestrol) of sodium hydride are added, followed by the dropwise addition of two chemical equivalents (based upon the amount of stilbestrol) of cyclopentyl bromide in 10 ml. of benzene over a period of 20 minutes. The mixture is allowed to reflux for 20 hours after which time the precipitate of sodium bromide is removed by filtration and the organic phase is dried and evaporated to yield 3,4-bis-(p-cyclopentyloxyphenyl)-3-hexane which is further purified upon recrystallization from pentane.

By following the procedure of this example, 1,2-bis-(p-cyclopentyloxyphenyl)-ethylene, 2,3 - bis-(p-cyclopentyloxyphenyl)-2-butene, and 4,5-bis-(p-cyclopentyloxyphenyl)-4-octene are prepared from the corresponding dihydroxy compounds.

Example 2

The procedure of Example 1 is repeated utilizing in lieu of the reactants therein employed, 5 g. of 3-(p-hydroxyphenyl)-4-phenyl-3-hexene and one chemical equivalent (based upon the amount of 3-(p-hydroxyphenyl)-4-phenyl-3-hexene) each of sodium hydride and cyclopentyl bromide, thus giving as a final product 3-(p-cyclopentyloxyphenyl)-4-phenyl-3-hexene.

Example 3

To a mixture of 6.7 g. of stilbestrol in 60 ml. of pyridine is added 2.34 ml. of acetic anhydride in 10 ml. of pyridine under nitrogen at 0° C. The mixture is stirred for 10 minutes and allowed to stand at 10° C. for 16 hours. This mixture is then extracted with methylene chloride and these extracts are washed with water and dried giving a solution containing a mixture of mono- and diacetoxystilbestrol. This mixture is chromatographed on a silica gel column to separate 3-(p-acetoxyphenyl) - 4 - (p-hydroxyphenyl) - 3 - hexene therefrom, which is further purified upon recrystallization from acetone:ether.

Similarly, the corresponding propionoxy derivative is prepared by substituting an equivalent amount of propionic anhydride for acetic anhydride.

The compound thus obtained is treated according to the procedure set forth in Example 2 above, thus giving as a final product therefrom 3-(p-acetoxyphenyl)-4-(p-cyclopentyloxyphenyl)-3-hexene.

A solution of 0.17 g. of potassium hydroxide in 0.2 ml. of water and 2.5 ml. of methanol is added over 30 minutes to a refluxing solution of 1 g. of 3-(p-acetoxyphenyl)-4-(p-cyclopentyloxyphenyl)-3-hexene in 30 ml. of methanol under nitrogen. The solution is refluxed for 2 hours, cooled, neutralized with acetic acid and concentrated under reduced pressure. After the addition of water, the solid which forms is collected by filtration and dried to yield 3-(p-hydroxyphenyl)-4-(p-cyclopentyloxyphenyl)-3-hexene which is recrystallized from acetone:hexane.

The hydroxyl group of the compound thus prepared can be etherified according to the following procedures.

Two milliliters of dihydropyran are added to a solution of 1 g. of 3-(p-hydroxyphenyl)-4-(p-cyclopentyloxyphenyl)-3-hexene in 15 ml. of benzene. About 1 ml. is removed by distillation to remove moisture and 0.4 g. of p-toluenesulfonyl chloride is added to the cooled solution. This mixture is allowed to stand at room temperature for four days, and is then washed with aqueous sodium carbonate solution and water, dried and evaporated. The residue is chromatographed on neutral alumina, eluting with hexane, to yield 3-(p-tetrahydropyran-2'-yloxyphenyl)-4-(p-cyclopentyloxyphenyl)-3-hexene, which is recrystallized from pentane.

To a solution of 1 g. of 3-(p-hydroxyphenyl)-4-(p-cyclopentyloxyphenyl)-3-hexene in 20 ml. of benzene, 20 ml. of dihydrofuran is added. Five milliliters is distilled off to remove moisture, and the mixture is allowed to cool to room temperature. To the cooled mixture, 0.2 g. of freshly purified p-toluenesulfonyl chloride is added. The mixture is stirred at room temperature for 24 hours and then poured into an excess of 5% aqueous sodium bicarbonate solution. The product is extracted with ethyl acetate, the organic solution is washed with water to neutral, dried over anhydrous magnesium sulfate, and evaporated to dryness under reduced pressure. The oily residue crystallizes on the addition of ether to yield the 3-(p-tetrahydrofuran-2'-yloxyphenyl) - 4 - (p-cyclopentyloxyphenyl)-3-hexene.

Similarly, the compound obtained via the procedure set forth in the third paragraph of this example can be esterified via the following representative procedures.

A mixture of 2 g. of 3-(p-hydroxyphenyl)-4-(p-cyclopentyloxyphenyl)-3-hexene in 8 ml. of pyridine and 4 ml. of benzoyl chloride is heated at steam bath temperatures for one hour. The mixture is then poured into ice water and the solid which forms is collected by filtration, washed with water and dried to yield 3-(p-benzoyloxyphenyl)-4-(p - cyclopentyloxyphenyl) - 3 - hexene which is further purified through recrystallization from methylene chloride:hexane.

A mixture of 2 g. of 3-(p-hydroxyphenyl)-4-(p-cyclopentyloxyphenyl)-3-hexene in 8 ml. of pyridine and 4 ml. of adamantoyl chloride is heated at steam bath temperatures for one hour. The mixture is then poured into ice water and the solid which forms is collected by filtration, washed with water and dried to yield 3-(p-adamantoyloxyphenyl)-4-(p - cyclopentyloxyphenyl) - 3 - hexene which is further purified through recrystallization from methylene chloride:hexane.

In like manner, the other esters contemplated by this invention can be prepared.

In lieu of the esterification procedures set forth in the immediately preceding three paragraphs, the corresponding esters can be similarly prepared utilizing these procedures as a substitute for the procedure described in paragraph 1 of this example. Thereafter, the respective monoester is separated as described therein and etherified as illustrated by paragraph 2 of this example, thus giving the corresponding 3-(p-cyclopentyloxyphenyl)-4-(p-esterphenyl)-3-hexene as a final product.

The procedures set forth in this example can similarly be utilized on the following starting compounds:

1,2-bis-(p-hydroxyphenyl)-ethylene,
2,3-bis-(p-hydroxyphenyl)-2-butene, and
4,5-bis-(p-hydroxyphenyl)-4-octene, thus respectively preparing the corresponding monoacetate, monoacetate cyclopentyl ether, monohydroxycyclopentyl ether, tetrahydropyran-2'-yl cyclopentyl diether, tetrahydrofuran-2'-yl cyclopentyl diether, monobenzoyl cyclopentyl ether, and monoadamantoyl cyclopentyl ether compounds thereof.

What is claimed is:

1. A trans stilbene derivative having the formula:

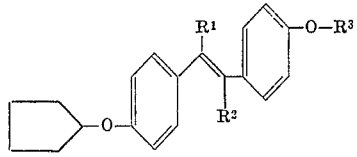

wherein each of $R^1$ and $R^2$ represent hydrogen or (lower) alkyl of of less than 6 carbon atoms and $R^3$ represents hydrogen, cyclopentyl, tetrahydrofuran-2'-yl, tetrahydropyran-2'-yl, or a hydrocarbon carboxylic acyl group of less than 12 carbon atoms.

2. The compound of claim 1 wherein $R^3$ is hydrogen.
3. The compound of claim 1 wherein $R^3$ is cyclopentyl.
4. The compound of claim 1 wherein each of $R^1$ and $R^2$ is ethyl.
5. The compound of claim 4 wherein $R^3$ is hydrogen.
6. The compound of claim 4 wherein $R^3$ is cyclopentyl.
7. The compound of claim 4 wherein $R^3$ is tetrahydrofuran-2'-yl.
8. The compound of claim 4 wherein $R^3$ is tetrahydropyran-2'-yl.
9. The compound of claim 4 wherein $R^3$ is acetyl.
10. The compound of claim 4 wherein $R^3$ is propionyl.

References Cited

UNITED STATES PATENTS 2,586,343  2/1952  Kaiser et al. _____ 260—613 XR
3,198,840  8/1965  Kaiser et al. _____ 260—613

HENRY R. JILES, *Primary Examiner.*

JOHN M. FORD, *Assistant Examiner.*

U.S. Cl. X.R.

260—240, 347.8, 410.5, 469, 476, 479, 613, 999